United States Patent
Leeth et al.

(10) Patent No.: US 10,480,696 B2
(45) Date of Patent: Nov. 19, 2019

(54) LOCKING COLLAR QUICK UNION CONNECTION

(71) Applicant: FORUM US, INC., Houston, TX (US)

(72) Inventors: Douglas Brian Leeth, Youngsville, LA (US); Roger Lane Suter, Katy, TX (US); Rajesh Krithivasan, Cypress, TX (US); Joseph David Gober, Houston, TX (US)

(73) Assignee: FORUM US, INC., Houston, TX (US)

( * ) Notice: Subject to any disclaimer, the term of this patent is extended or adjusted under 35 U.S.C. 154(b) by 777 days.

(21) Appl. No.: 14/955,841

(22) Filed: Dec. 1, 2015

(65) Prior Publication Data
US 2017/0152978 A1    Jun. 1, 2017

(51) Int. Cl.
| | |
|---|---|
| *F16L 37/08* | (2006.01) |
| *F16L 15/08* | (2006.01) |
| *E21B 17/046* | (2006.01) |
| *F16L 19/00* | (2006.01) |
| *F16L 19/02* | (2006.01) |

(52) U.S. Cl.
CPC ............ *F16L 37/08* (2013.01); *E21B 17/046* (2013.01); *F16L 15/08* (2013.01); *F16L 19/005* (2013.01); *F16L 19/0231* (2013.01)

(58) Field of Classification Search
CPC ................................ F16L 37/08; F16L 15/08
USPC ................. 285/81, 89–90, 93, 330, 415, 92, 285/333–334, 355, 390
See application file for complete search history.

(56) References Cited

U.S. PATENT DOCUMENTS

| | | | |
|---|---|---|---|
| 551,733 A * | 12/1895 | Mullenhoff .......... | F16L 25/065 285/361 |
| 1,238,218 A * | 8/1917 | Thompson et al. ... | F16L 37/252 285/331 |
| 2,313,169 A * | 3/1943 | Penick .................... | E21B 33/04 166/75.14 |
| 2,460,238 A * | 1/1949 | Penick ................ | E21B 33/0422 277/322 |
| 3,053,554 A * | 9/1962 | Magos .................... | F16L 27/02 285/114 |
| 4,043,575 A | 8/1977 | Roth | |
| 4,205,866 A * | 6/1980 | McCracken ........ | F16L 27/0832 285/281 |
| 4,280,719 A * | 7/1981 | Daniel .................. | F16L 37/107 285/377 |

(Continued)

FOREIGN PATENT DOCUMENTS

GB      2514608 A     12/2014

OTHER PUBLICATIONS

International Search Report and Written Opinion dated Mar. 3, 2017 of International Application No. PCT/US2016/064489.

*Primary Examiner* — Anna M Momper
*Assistant Examiner* — Fannie C Kee
(74) *Attorney, Agent, or Firm* — Patterson & Sheridan, L.L.P.

(57) ABSTRACT

A locking collar quick union connection comprises a split ring and a locking collar sub assembly. The locking collar sub assembly includes a collar, a locking ring, and a locking screw. The locking ring includes outer threads that engage inner threads formed on a larger inner diameter portion of the collar. The split ring includes outer threads that engage inner threads formed on a smaller inner diameter portion of the collar. The locking screw rotationally locks the locking ring to the locking collar.

11 Claims, 4 Drawing Sheets

(56) References Cited

U.S. PATENT DOCUMENTS

| | | | |
|---|---|---|---|
| 4,524,998 A * | 6/1985 | Brisco | E21B 17/08 |
| | | | 166/70 |
| 4,613,162 A * | 9/1986 | Hughes | E21B 33/038 |
| | | | 166/242.6 |
| 4,818,135 A | 4/1989 | Desjardins | |
| 4,902,044 A * | 2/1990 | Williams | E21B 33/038 |
| | | | 166/340 |
| 5,192,219 A | 3/1993 | Fowler et al. | |
| 5,957,716 A | 9/1999 | Buckley et al. | |
| 6,609,734 B1 * | 8/2003 | Baugh | E21B 33/038 |
| | | | 285/123.13 |
| 6,840,679 B2 | 1/2005 | Lenick et al. | |
| 7,686,087 B2 * | 3/2010 | Pallini | E21B 17/085 |
| | | | 166/338 |
| 8,479,824 B2 * | 7/2013 | Travis | E21B 33/0422 |
| | | | 166/344 |
| 8,740,260 B1 * | 6/2014 | Liew | E21B 33/03 |
| | | | 285/364 |
| 2004/0258501 A1 | 12/2004 | Swan | |
| 2005/0145391 A1 | 7/2005 | Lequang et al. | |
| 2011/0227336 A1 | 9/2011 | Mogedal et al. | |
| 2015/0198271 A1 | 7/2015 | Wright | |

\* cited by examiner

LOCKING COLLAR QUICK UNION CONNECTION

BACKGROUND

Field of the Disclosure

Embodiments of the disclosure generally relate to a locking collar quick union connection.

Description of the Related Art

Quick union connections are typically used to connect different components of various types of oilfield equipment. Quick union connections usually have a collar with ACME threads (e.g. standard, stub, or modified threads) that is threaded to a mating component. The threads are not preloaded when initially assembled, but rather, when the oilfield equipment is placed under pressure, the quick union connection is subjected to an axial load that loads the threads in the axial direction.

However, when the oilfield equipment that is connected together with the quick union connection is subject to a high vibration environment (such as when conducting a fracturing operation using the oilfield equipment), the harmonics of the vibrations induce a radial acceleration that may loosen the quick union connection. In particular, the collar of the quick union connection tends to "back out" and unthread from the mating component, thereby loosening the threaded connection. This loosening of the threaded connection compromises the fluid containment capabilities of the quick union connection and the oilfield equipment, as well as the safety of personnel working near the oilfield equipment and other equipment operating nearby.

Prior methods of using straps to hold down the oilfield equipment, replacing the quick union connection with a bolted flange connection, or axially loading the threads by pressure loading the quick union connection have numerous disadvantages. The use of multiple straps to physically strap down the oilfield equipment creates more work and can actually become a hazard to personnel working near the oilfield equipment. The use of bolted flange connections increases the amount of time needed to assemble and disassemble the connection due to additional tooling and the alignment of the oilfield equipment that is necessary to assemble and disassemble the bolted flange connection. Furthermore, bolted flange connections cannot retrofit to existing oilfield equipment and would require a complete change out of equipment. Axially loading the threads by pressurizing the connection is done by trial and error as the pressure required to produce the axial load required to prevent vibration backoff varies with the various configurations of oilfield equipment/applications.

Therefore, there is a need for new and improved quick union connections.

SUMMARY

A locking collar quick union connection, comprising a split ring; and a locking collar sub assembly including a collar, a locking ring, and a locking screw, wherein the locking ring includes outer threads that engage inner threads formed on a larger inner diameter portion of the collar, wherein the split ring includes outer threads that engage inner threads formed on a smaller inner diameter portion of the collar, and wherein the locking screw rotationally locks the locking ring to the collar.

A method of assembling a locking collar quick union connection to connect a pin end to a box end, comprising threading a split collar sub-assembly at least partially onto the box end, wherein the split collar sub-assembly includes a collar, a locking ring, and a locking screw; inserting the pin end into the split collar sub-assembly to engage the box end; enclosing a split ring around the pin end; threading the split ring into the collar; rotationally locking the split ring to the collar; further threading the split collar sub-assembly onto the box end until the split ring contacts an outer shoulder on the pin end; and rotating the locking screw to force the locking ring radially inward into engagement with the box end to rotationally lock the split collar sub-assembly to the box end.

BRIEF DESCRIPTION OF THE DRAWINGS

So that the manner in which the above recited features of the disclosure can be understood in detail, a more particular description of embodiments of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The embodiments described herein generally relate to a locking collar quick union connection for connecting oilfield equipment together. The locking collar quick union connection can retrofit to assemble connections between current oilfield equipment. Examples of oilfield equipment that can be connected together with the embodiments disclosed herein may include, but are not limited to, blow out preventers, pumps, valves, adapters, and other wellhead equipment. Although the embodiments of the locking collar quick union connection are described herein relative to oilfield equipment, the embodiments can be used to connect other types of equipment.

Figure 1:
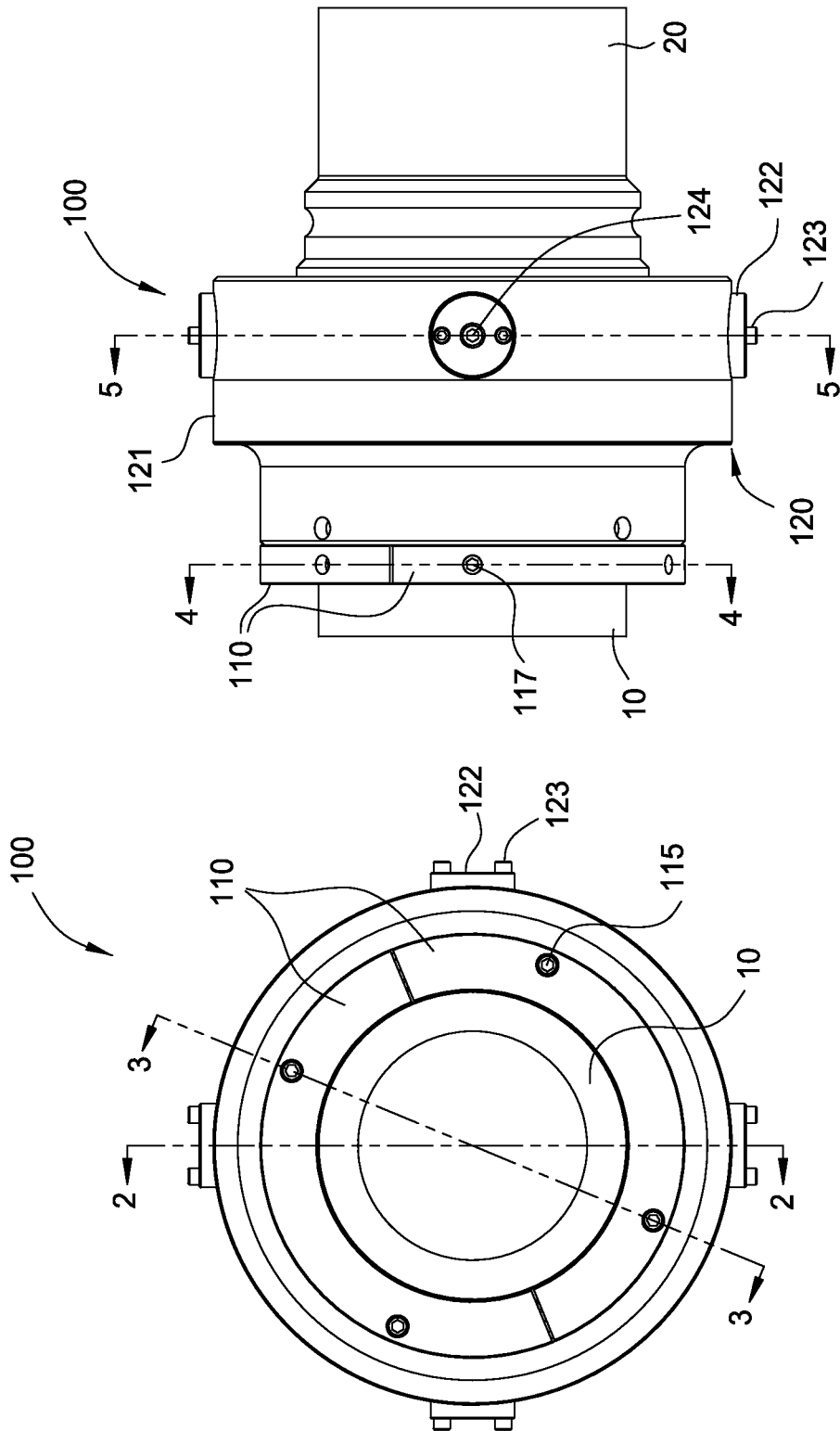
FIG. 1A illustrates a top view of a locking collar quick union connection, according to one embodiment.
FIG. 1B illustrates a side view of the locking collar quick union connection.
Figure 2:
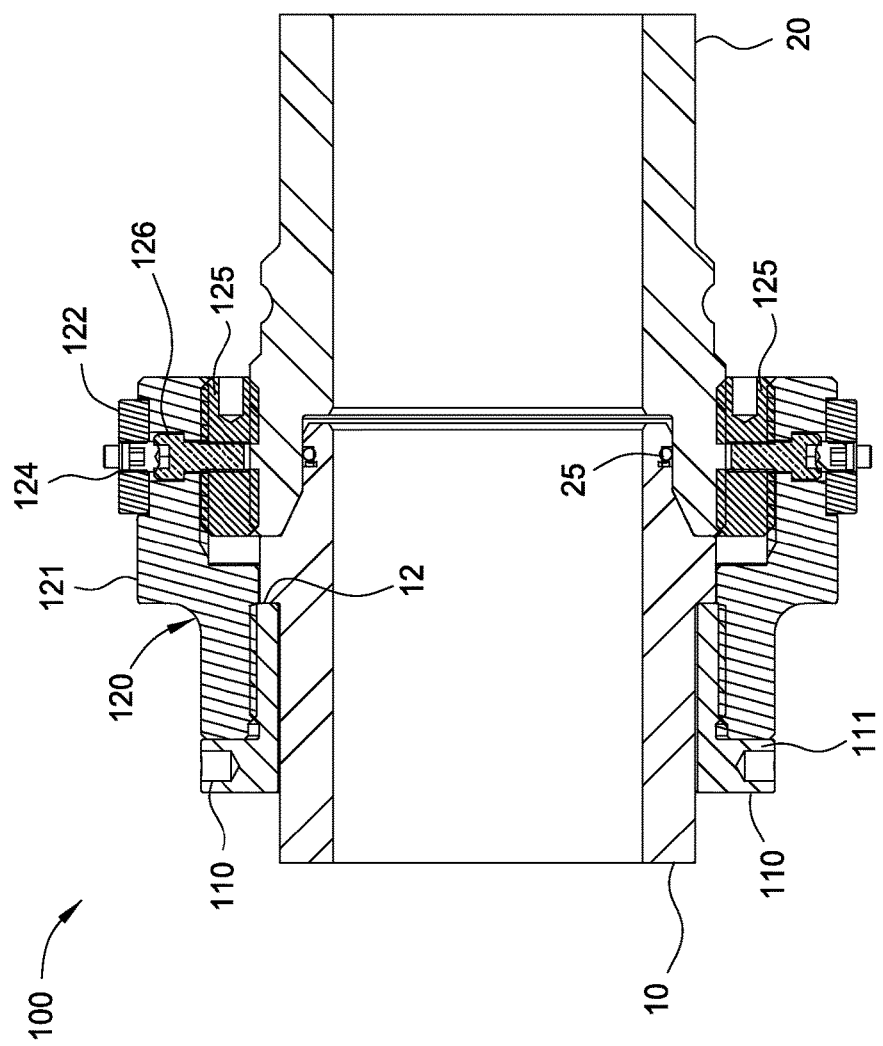
FIG. 2 illustrates a sectional view of the locking collar quick union connection taken along line "2-2" of FIG. 1A.
Figure 3:
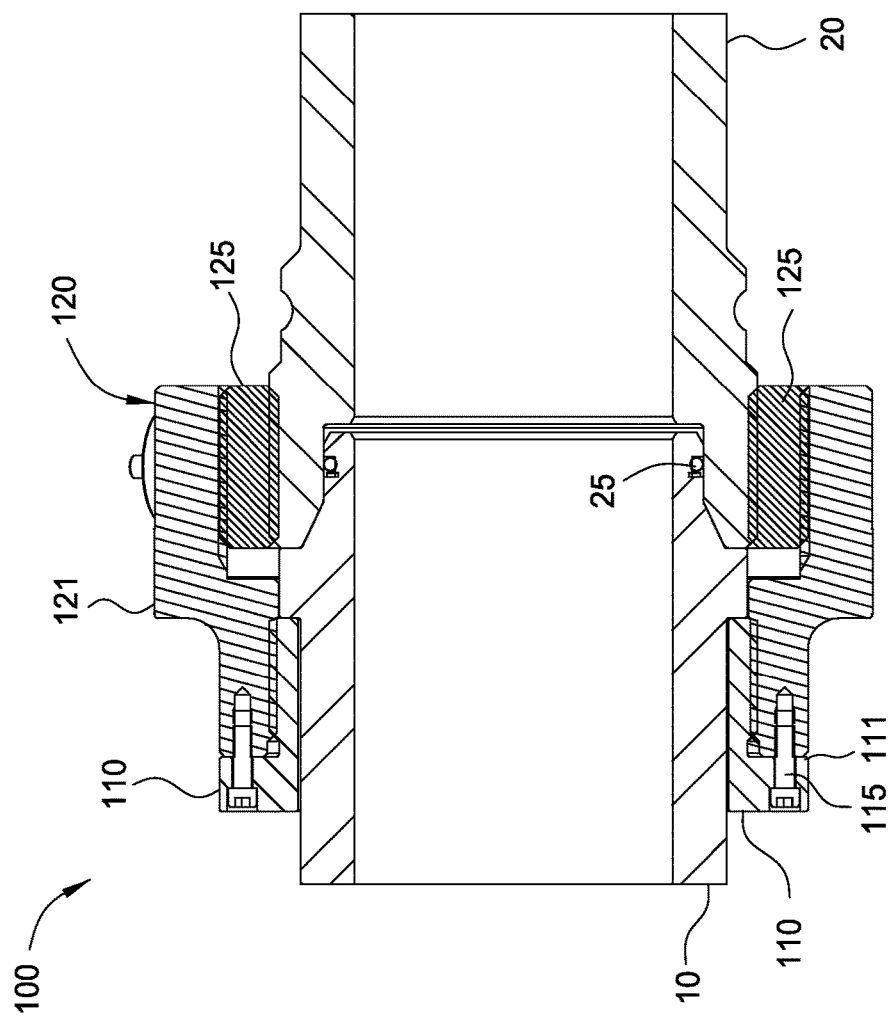
FIG. 3 illustrates a sectional view of the locking collar quick union connection taken along line "3-3" of FIG. 1A.

FIG. 1A and FIG. 1B illustrate top and side views, respectively, of a locking collar quick union connection 100 connecting a pin end 10 of one piece of oilfield equipment to a box end 20 of another piece of oilfield equipment, according to one embodiment. The pin end 10 and the box end 20 may form the pin and box ends of any types of oilfield equipment that are to be connected together, such as to form a tool string. A seal 25 (such as an o-ring as shown in FIGS. 2 and 3) forms a pressure containing seal between the pin end 10 and the box end 20. The locking collar quick union connection 100 is configured to quickly and easily form a connection between any two pieces of oilfield equipment, while maintaining a robust connection when subjected to high vibration environments.

Referring to FIGS. 1A and 1B, the locking collar quick union connection 100 includes a split ring 110, one or more set screws 117, one or more cap screws 115, one or more set screws 124, and a split collar sub-assembly 120. The split collar sub-assembly 120 includes a collar 121, a locking ring 125, one or more locking screws 126, one or more cover plates 122, and one or more cap screws 123. The split ring 110 has a body that is split into two halves, which are enclosed around the pin end 10. Each half of the split ring 110 includes one or more holes for receiving cap screws 115 to rotationally lock the split ring 110 to the collar 121, as well as one or more holes for receiving set screws 117 to rotationally lock the split ring 110 to the pin end 10. The split ring 110 is threadedly connected to the collar 121 as shown in FIGS. 2 and 3.

The split collar sub-assembly 120 includes the collar 121 that is positioned around the pin end 10 and the box end 20. The split collar sub-assembly 120 further includes one or more cover plates 122 that are coupled to the outer surface of the collar 121 by one or more cap screws 123. Each cover plate 122 includes a hole for receiving a set screw 124. Each cover plate 122 and set screw 124 is configured to retain and force a locking screw 126 that threads into and moves the locking ring 125 (shown in FIGS. 2 and 5) as further described below.

FIG. 2 illustrates a sectional view of the locking collar quick union connection 100 taken along line "2-2" of FIG. 1A. As shown in FIG. 2, the split collar sub-assembly 120 further includes the locking ring 125 positioned between the collar 121 and the box end 20. The locking ring 125 has a body that is split into two halves, which are enclosed around the box end 20. The locking ring 125 is threadedly connected to the collar 121 such that the bottom ends of the locking ring 125 and the collar 121 are substantially flush.

Each half of the locking ring 125 includes outer threads that engage inner threads formed on the inner diameter of the collar 121. Each half of the locking ring 125 also includes inner threads that engage outer threads formed on the outer diameter of the box end 20. The locking screw 126 is inserted into a counter bore formed in the collar 121 and threaded into a threaded bore of the locking ring 125. Rotation of the locking screw 126 in one direction forces each half of the locking ring 125 radially inward into engagement with the box end 20 to rotationally lock the locking ring 125 to the box end 20. Rotation of the locking screw 126 in an opposite direction forces each half of the locking ring 125 radially outward from engagement with the box end 20 to unlock the locking ring 125 from the box end 20 to facilitate assembly or disassembly.

As further illustrated in FIG. 2, the split ring 110 has outer threads formed along a lower portion that engage inner threads formed on a smaller inner diameter portion of the collar 121. The split ring 110 includes an upper shoulder 111 that is substantially flush with the upper end of the collar 121. The lower end of the split ring 110 contacts an outer shoulder 12 of the pin end 10 when the locking collar quick union connection 100 is fully assembled.

FIG. 3 illustrates a sectional view of the locking collar quick union connection 100 taken along line "3-3" of FIG. 1A. As shown in FIG. 3, after the split ring 110 is threaded into the collar 121, the cap screws 115 are threaded through the upper shoulder 111 of the split ring 110 and into threaded bores of the collar 121. The cap screws 115 rotationally lock the split ring 110 to the collar 121 so that the split ring 110 rotates with the collar 121.

Figure 4:
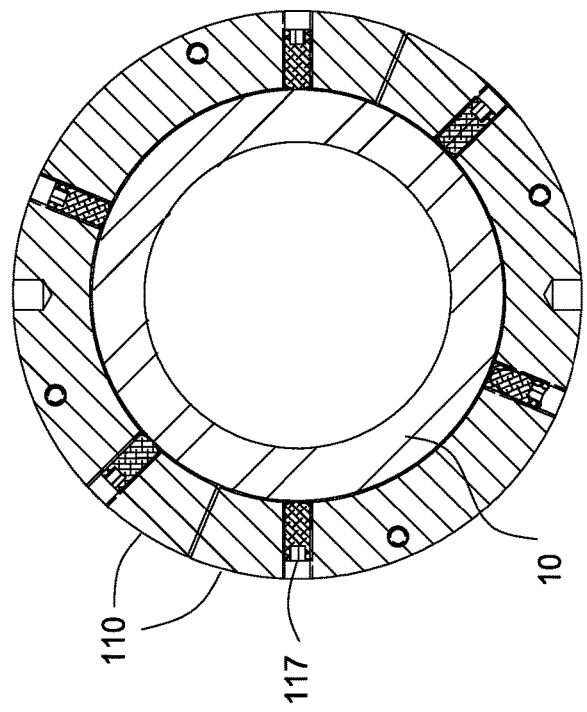
FIG. 4 illustrates a sectional view of the locking collar quick union connection taken along line "4-4" of FIG. 1B.

FIG. 4 illustrates a sectional view of the locking collar quick union connection 100 taken along line "4-4" of FIG. 1B. As shown in FIG. 4, after the split ring 110 and split collar sub-assembly 120 are fully assembled onto the box end 20, the set screws 117 are threaded through the split ring 110 and into contact with the pin end 10. The set screws 117 rotationally lock the split ring 110 to the pin end 10.

Figure 5:
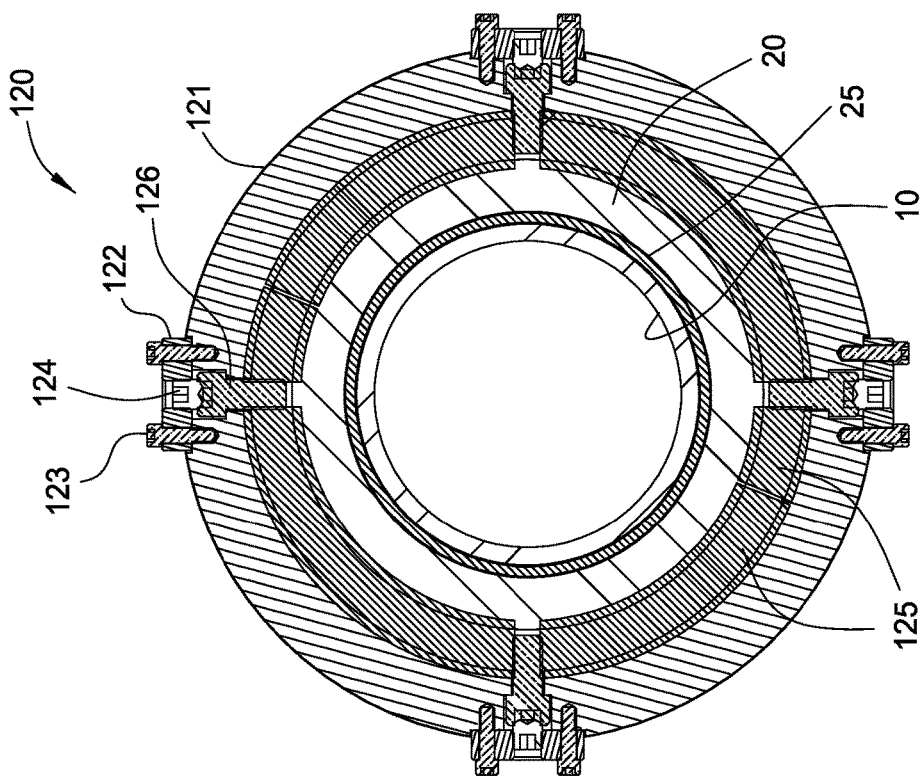
FIG. 5 illustrates a sectional view of the locking collar quick union connection taken along line "5-5" of FIG. 1B.

FIG. 5 illustrates a sectional view of the locking collar quick union connection 100 taken along line "5-5" of FIG. 1B. As shown in FIG. 5, after the split ring 110 and the split collar sub-assembly 120 are fully assembled onto the box end 20, the locking screws 126 (which are retained within the counter bores of the collar 121) are rotated to force each half of the locking ring 125 radially inward into engagement with the box end 20 to rotationally lock the locking ring 125 to the box end 20. The set screws 124 are subsequently threaded into the cover plates 122 and/or the collar 121 to retain the locking screws 126 in place. The cover plates 122 may also be used to force the locking screws 126 to move the locking ring 125 in the radial direction.

A method of assembling the locking collar quick union connection 100 to connect the pin end 10 to the box end 20, according to one embodiment, will now be described. Referring to FIG. 2, the split collar sub-assembly 120 may be in a pre-assembled state. Specifically, the two halves of the locking ring 125 are uniformly threaded into the larger inner diameter portion of the collar 121. The locking ring 125 is rotationally aligned so that the bottom face of the collar 121 and the bottom face of the locking ring 125 are substantially flush, and so that the locking screws 126 can be inserted into the counter bores of the collar 121 and threaded into the corresponding threaded bores of the locking ring 125. The locking screws 126 rotationally lock the locking ring 125 to the collar 121 so that they rotate together. The cover plates 122 can then be secured to the collar 121 using the cap screws 123.

The split collar sub-assembly 120 can then be partially threaded onto the box end 20 without making up the entire threaded connection. Specifically, the inner threads of the locking ring 125 are threaded onto the outer threads of the box end 20 only part of the way without threading the locking ring 125 all the way through the outer threads of the box end 20. The remainder of the threaded connection will be completed in subsequent steps as further described below.

The pin end 10 along with the seal 25 can then be inserted through the collar 121 and into engagement with the box end 20. The halves of the split ring 110 can then be enclosed around the pin end 10 and uniformly threaded into the smaller inner diameter portion of the collar 121 until the upper shoulder 111 of the split ring 110 contacts the upper end of the collar 121. The split ring 110 is rotationally aligned so that the cap screws 115 can be threaded through the split ring 110 and into the corresponding threaded bores of the collar 121. The cap screws 115 rotationally lock the split ring 110 to the collar 121 so that they rotate together.

The split ring 110 and the split collar sub-assembly 120 are rotated together to complete the assembly of the threaded connection between the inner threads of the locking ring 125 and the outer threads of the box end 20. To fully assemble the connection, the split ring 110 and the split collar sub-assembly 120 are threaded onto the box end 20 until the bottom end of the split ring 110 contacts the outer shoulder 12 formed on the pin end 10. When the threaded connection is fully assembled, the locking screws 126 can be rotated to force the locking ring 125 radially inward to rotationally lock the locking ring 125 to the box end 20 and prevent movement of the locking ring 125 in the radial direction. The locking screws 126 can be rotated in the opposite direction to move the locking ring 125 radially outward to unlock the locking ring 125 from the box end 20.

Subsequently, the set screws 124 can be threaded through the cover plates 122 as an additional mechanism to lock the locking screws 126 in place. In addition, the set screws 117 can be threaded through the split ring 110 and into contact with the outer surface of the pin end 10 as an additional mechanism to rotationally lock the split ring 110 to the pin end 10. The above method can be performed in reverse order to disassemble the locking collar quick union connection 100 and thereby disconnect the pin end 10 from the box end 20.

In an alternative embodiment, the body of the split ring 110 may be split into two or more separate pieces. In an alternative embodiment, the collar 121 may be split into two or more separate pieces. In an alternative embodiment, the body of the locking ring 125 may be split into two or more separate pieces. In an alternative embodiment, the one, two, or more locking screws 126 may be used to rotationally lock the locking ring 125 to the box end 20. In an alternative embodiment, other screw or clamp type mechanisms may be used to force the locking ring 125 radially inward and outward relative to the box end 20.

In addition to the foregoing embodiments, other and further embodiments may be devised without departing from the basic scope thereof, and the scope thereof is determined by the claims that follow.

We claim:

1. A locking collar quick union connection, comprising:
a split ring; and
a locking collar sub assembly including a collar, a locking ring, and a locking screw,
wherein the locking ring includes outer threads that engage inner threads formed on a larger inner diameter portion of the collar, wherein the split ring includes outer threads that engage inner threads formed on a smaller inner diameter portion of the collar, wherein the locking screw is threaded into a threaded bore of the locking ring and rotationally locks the locking ring to the collar, wherein rotation of the locking screw in one direction forces the locking ring radially inward, and wherein rotation of the locking screw in an opposite direction forces the locking ring radially outward.

2. The locking collar quick union connection of claim 1, wherein a body of the split ring is split into two halves.

3. The locking collar quick union connection of claim 1, wherein the split ring includes an upper shoulder that is substantially flush with an upper end of the collar when the split ring is threaded into the smaller inner diameter portion of the collar.

4. The locking collar quick union connection of claim 1, wherein a body of the locking ring is split into two halves.

5. The locking collar quick union connection of claim 1, wherein a bottom end of the locking ring is substantially flush with a bottom end of the collar when the locking ring is threaded into the larger inner diameter portion of the collar.

6. The locking collar quick union connection of claim 1, wherein the locking ring includes inner threads configured to thread onto a threaded box end.

7. The locking collar quick union connection of claim 1, wherein the locking screw is inserted into a counter bore formed in the collar.

8. The locking collar quick union connection of claim 7, wherein the locking ring is moved into a rotationally locked position by rotation of the locking screw in one direction, and wherein the locking ring is moved out of the rotationally locked position by rotation of the locking screw in the opposite direction.

9. The locking collar quick union connection of claim 7, further comprising a cover plate connected to an outer surface of the collar to force the locking screw to move the locking ring in a radial direction and to retain the locking screw within the collar.

10. The locking collar quick union connection of claim 9, further comprising a set screw connected to the cover plate to retain the locking screw within the collar.

11. The locking collar quick union connection of claim 1, further comprising one or more cap screws that rotationally lock the split ring to the collar.

* * * * *